(12) United States Patent
Wilhelm et al.

(10) Patent No.: US 9,453,684 B2
(45) Date of Patent: Sep. 27, 2016

(54) HEAT EXCHANGER FOR THE COOLING OF HOT GASES AND HEAT EXCHANGE SYSTEM

(75) Inventors: Alfred Joachim Wilhelm, Bologna (IT); Luca Eugenio Basini, Milan (IT)

(73) Assignee: ENI S.P.A. (IT)

( * ) Notice: Subject to any disclaimer, the term of this patent is extended or adjusted under 35 U.S.C. 154(b) by 726 days.

(21) Appl. No.: 13/976,838

(22) PCT Filed: Dec. 29, 2011

(86) PCT No.: PCT/EP2011/074201
§ 371 (c)(1),
(2), (4) Date: Aug. 6, 2013

(87) PCT Pub. No.: WO2012/089793
PCT Pub. Date: Jul. 5, 2012

(65) Prior Publication Data
US 2013/0313482 A1    Nov. 28, 2013

(30) Foreign Application Priority Data

Dec. 29, 2010    (IT) .............................. MI2010A2445

(51) Int. Cl.
*F28D 7/02* (2006.01)
*C01B 3/32* (2006.01)
(Continued)

(52) U.S. Cl.
CPC .. *F28D 7/02* (2013.01); *B01J 7/00* (2013.01); *C01B 3/32* (2013.01); *C01B 3/386* (2013.01); *C01B 3/48* (2013.01); *F28D 7/024* (2013.01); *C01B 2203/0261* (2013.01); *C01B 2203/0283* (2013.01); *C01B 2203/047* (2013.01);
(Continued)

(58) Field of Classification Search
CPC combination set(s) only.
See application file for complete search history.

(56) References Cited

U.S. PATENT DOCUMENTS 3,552,487 A * 1/1971 Tokumitsu ............. C10G 9/002
165/174
3,866,432 A * 2/1975 Harrison ................. F25D 25/04
198/778

(Continued)

FOREIGN PATENT DOCUMENTS

DE    1551526 A1    4/1970
WO    9601403 A1    1/1996

(Continued)

*Primary Examiner* — Kaity Handal
(74) *Attorney, Agent, or Firm* — Tarolli, Sundheim, Covell & Tummino LLP

(57) ABSTRACT

A heat exchanger for the cooling of hot gases by means of a cooling fluid includes at least one vertically oriented tank containing a cooling fluid bath and having a collection space of the vapor phase generated above said cooling fluid bath, at least one vertical tubular element inserted inside said tank, and submerged in the bath open at the ends and coaxial to the tank, at least one spiral duct which rotates around the axis of the tank, inserted in the coaxial tubular element, at least one outlet for the vapor phase generated on the head of tank, wherein at least one transfer line is inserted in the lower part of the vertical tank for feeding the hot gases to the tank, the transfer line being open at the two ends, of which one is connected with the vertical tank and the other is free and outside the tank, the transfer line being tubular and protruding laterally outside the exchanger, the transfer line containing at least one central internal duct having an outer jacket in which a cooling fluid circulates, said central internal duct being in fluid connection with the spiral duct and developing vertically along the tubular element inserted in the vertical tank.

19 Claims, 1 Drawing Sheet

(51) Int. Cl.
    *B01J 7/00*     (2006.01)
    *C01B 3/38*     (2006.01)
    *C01B 3/48*     (2006.01)
    *F28D 21/00*     (2006.01)

(52) U.S. Cl.
    CPC .......... *C01B2203/0894* (2013.01); *C01B 2203/1276* (2013.01); *C01B 2203/1288* (2013.01); *C01B 2203/82* (2013.01); *C10G 2300/1011* (2013.01); *F28D 2021/0075* (2013.01); *Y02P 30/20* (2015.11)

(56) References Cited

U.S. PATENT DOCUMENTS

| | | | | |
|---|---|---|---|---|
| 5,088,551 A * | 2/1992 | Brucher | ............... | F28D 7/005 122/512 |
| 5,397,381 A * | 3/1995 | Keintzel | ............... | B01D 53/18 95/213 |
| 5,955,037 A * | 9/1999 | Holst | ............... | B01D 47/06 406/193 |
| 6,148,908 A * | 11/2000 | Brucher | ............... | C10G 9/002 165/134.1 |
| 7,587,995 B2 * | 9/2009 | Kraft | ............... | C10J 3/84 122/7 R |
| 9,051,522 B2 * | 6/2015 | Jancker | ............... | C10J 3/485 |
| 2007/0267171 A1 * | 11/2007 | Herwig | ............... | C01B 3/36 165/61 |
| 2007/0283907 A1 * | 12/2007 | Brinkmann | ............... | F22B 1/1884 122/460 |
| 2007/0295018 A1 * | 12/2007 | Williams | ............... | F24D 17/02 62/238.6 |
| 2008/0141951 A1 * | 6/2008 | Liu | ............... | C01B 3/323 122/18.2 |
| 2008/0142408 A1 * | 6/2008 | Eilers | ............... | C01B 3/36 208/61 |

FOREIGN PATENT DOCUMENTS

| | | |
|---|---|---|
| WO | 2005015105 A1 | 2/2005 |
| WO | 2007116045 A1 | 10/2007 |

\* cited by examiner

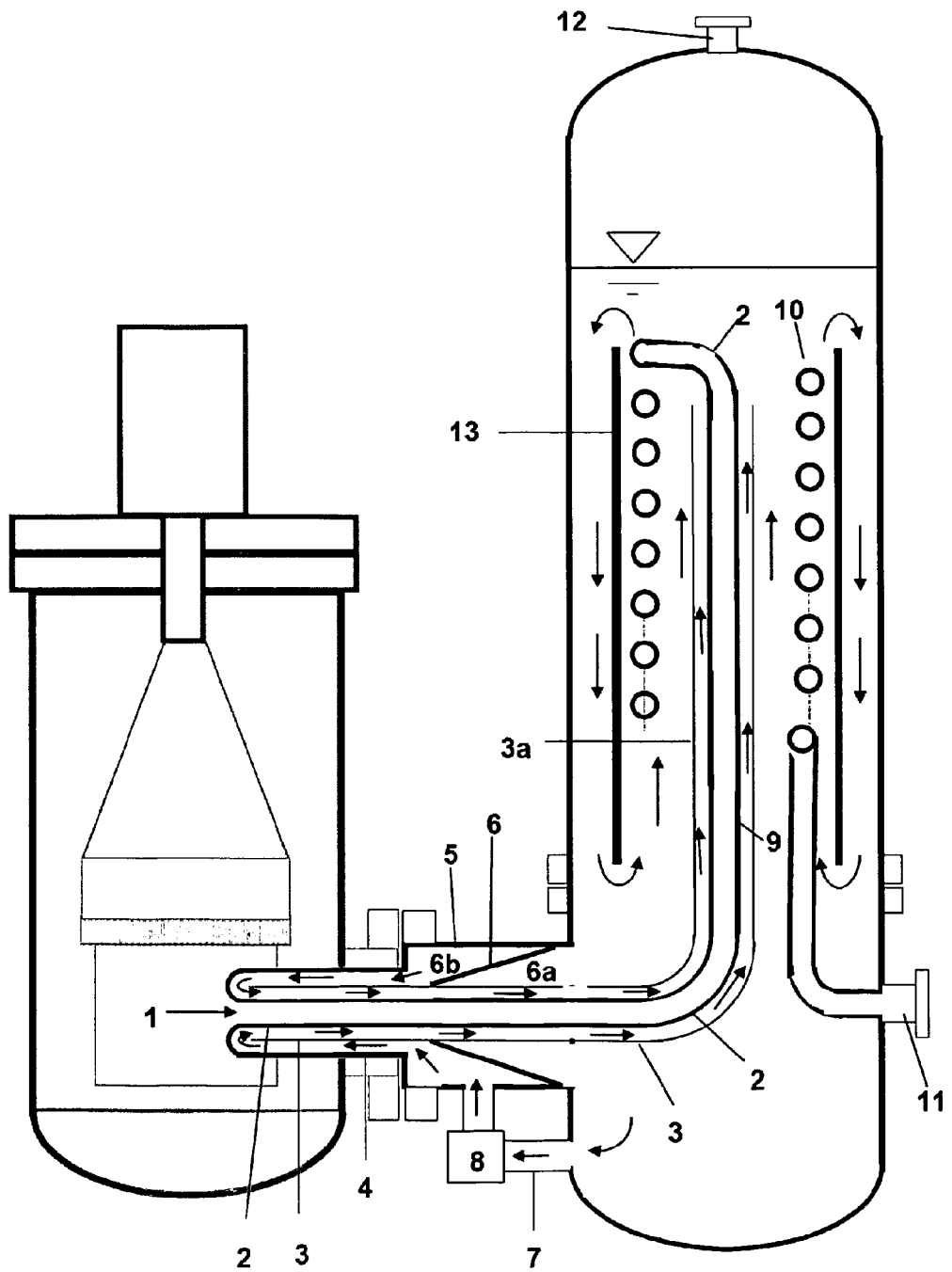

HEAT EXCHANGER FOR THE COOLING OF HOT GASES AND HEAT EXCHANGE SYSTEM

RELATED APPLICATION

This application is a National Phase filing of PCT/EP2011/074201, filed Dec. 29, 2011, and claims priority to Italian Application No. MI2010A002445, filed Dec. 29, 2010, the subject matter of which are incorporated herein by reference in their entirety.

The present invention relates to a heat exchanger with cooling fluid for the cooling of a hot gas and the simultaneous production of steam. More specifically, it relates to a heat exchanger for the cooling of a hot gas coming from a catalytic partial oxidation process and with the simultaneous production of vapour in a separate stream.

A problem of primary importance in processes which generate high-temperature gas is the rapid cooling of the hot gases produced and the consequent recovery of the heat contained therein.

A plant in a process which produces high-temperature gas normally comprises:
  a reactor which generates hot gases consisting of refractory material
  a transfer line of the hot gases towards the heat exchanger, both consisting of refractory material.

The lower part and tube plate of the exchanger are composed of refractory material. The heat exchanger generally functions with water and during the cooling it generates vapour. The vapour in excess is used for purposes external to the heat exchange process. One of the parts most subject to damage during the running of these plants is constituted by the refractory zones, which must be accurately designed and realized. These zones during running, can be subject to fractures, both when the plant is operating under stationary conditions and also and above all during transitory start-up and quenching periods of the plant.

Laying and wear defects of the refractory material can accelerate the formation of cracks during industrial running, mainly in the parts where there is a differential thermal expansion between refractory and steel parts. This occurs particularly in the points in which the hot gas produced is transferred to the cooling and vapour generation section. The cracks can bring hot gas in contact with the metallic walls of the reactor, the transfer line and heat exchanger, and cause an overheating of the metallic walls of the casing which operates at high pressures. In order to monitor these events, the metallic walls must be coated with a thermochromic paint which changes colour in the case of overheating and in some critical points it is appropriate to adhere a few "skin" thermocouples to the metallic surfaces in order to measure the reached temperature values. The overheating of the metallic walls can cause an exceeding of the admissible temperatures and require the quenching of the plant in addition to the reconstruction of the damaged refractory part.

The Applicant has found an innovative technical solution for solving the critical aspects described above. The technical solution proposed by the Applicant is the substitution of part of the refractory material present in the transfer line, in the lower part of the heat exchanger and in the tube plate, with a heat exchanger with the circulation of a cooling fluid, such as water for example.

The advantages offered by the present invention are generally a reduction in maintenance interventions, an increase in the operative safety, energy efficiency, operativeness and availability in the industrial running of the plants.

The technical solution proposed can be advantageously applied in Catalytic Partial Oxidation processes which generate high-temperature synthesis gas.

In these cases, the cooling fluid used can be integrated in the internal circulation of the process or come from a side-stream.

U.S. Pat. No. 7,552,701 discloses an exchanger which produces overheated vapour by cooling a hot gas with water. Said boiler is a single vertical container having an inlet for hot gases on the lower side part. The exchanger contains at least two parallel spiral ducts composed of a vertical part which develops around the axis of the container and a horizontal part which protrudes laterally in the lower area of the container. The spiral ducts develop along the whole vessel and for a certain length are immersed in the boiling water bath, whereas from a certain point onwards they develop in the upper part of the container in which the saturated gas is collected. In the collection space of the saturated vapour the ducts have a jacket in which saturated vapour circulates which further cools the hot gases producing overheated vapour. A downcomer is inserted axially in the vertical part of the boiler close to the fresh water inlet so as to allow downward circulation of the water in its interior. The water circulates upwards outside the downcomer. The spiral duct rotates around the downcomer. According to a preferred embodiment, the exchanger is fluidly connected with a partial oxidation reactor, in particular the outlet of the reactor is in fluid connection with the inlet of the exchanger. The patent does not indicate the presence of refractory material in the hot gas inlet area of the exchanger, but it is reasonable to think that in the coupled reactor-exchanger system the section of tube leaving the reactor in which the hot gases flow consists of refractory material like the rest of the reactor. The part of connection between reactor and exchanger therefore remains a critical point, from a mechanical point of view, as it is subject to high temperatures which can cause the formation of cracks.

U.S. Pat. No. 4,029,054 discloses an exchanger for the cooling, by means of a cold fluid, of very hot gases, such as for example raw synthesis gas, in order to recover the thermal energy contained in said gases. The exchanger comprises two distinct chambers separated by means of a separator plate (flat or spherical), but connected to each other through the passage tubes of the hot gases. The lower chamber is the feeding zone of the hot gases and it is coated with a refractory material. The upper chamber is the cooling zone of the hot gases and comprises at least one primary line for the cold fluid. The passage lines of the hot gas pass through the separation plate and are jacketed with cold fluid circulating through a secondary cold fluid circuit. Said secondary circuit is necessary as this is the point in which the gas has its highest temperature, it ensures an optimum cooling of a critical area. To support this, the lower part of the separation plate consists of refractory material. The passage lines of the hot gas are connected to the discharge lines situated on the head of the upper chamber by means of helicoidal cooling tubes wound around a central axial tube. In order to obtain an extremely good heat exchange, the cold fluid is forced to circulate downwards into the central zone of said tube and upwards into the annular space outside the tube following a rotational movement in order to favour a more effective heat exchange.

U.S. Pat. No. 4,488,513 discloses an exchanger for cooling a hot gas, in particular synthesis gas coming from partial oxidation processes, thus recovering the sensitive heat and contemporaneously producing overheated vapour. The exchanger comprises two superimposed separate and distinct areas, connected to each other by means of a series of passage lines of the hot gases suitably jacketed. The upper part comprises a vertical pressurized vessel, cylindrical and closed having an outlet in the upper part for the overheated vapour. This vessel is partially filled with boiling water which forms the first cooling area of the hot gases, whereas the upper part is free and saturated with overheated vapour which forms the second cooling area. Helicoidal tube bundles are uniformly and radially arranged around a central axis, in which one helix is ascending and one descending. The boiling water bath fills the vessel to the bottom of the vessel and is connected with water feeding. The lower part is coated with a refractory material and is the hot gas feeding zone. In this area, the hot gas is divided into a series of jacketed passage tubes connected to the helicoidal tube bundles of the upper area. The jacket of the passage tubes prevents damage due to the high temperatures.

U.S. Pat. No. 4,462,339 discloses an exchanger for the cooling of hot gases by means of water, such as those coming from partial oxidations, thus recovering the sensible heat and contemporaneously producing saturated and/or overheated vapour. The exchanger comprises two distinct and separate parts, connected to each other by means of jacketed annular passages in which water circulates. The lower part is coated with refractory material and forms the feeding chamber of the hot gas. The upper part is a closed vessel, cylindrical, vertical and pressurized, containing a central cylindrical chamber closed on the bottom and open at the head containing at least one helicoidal tube bundle, a central outlet at the head for the saturated gas, various helicoidal tube bundles which extend in the annular area between the central chamber and the wall of the vessel. The outlet of the helicoidal tubes of the annular area is connected to the inlet of the helicoidal tubes of the central chamber. Water circulates in the annular area evaporating and producing saturated vapour. The saturated vapour can be discharged or overheated in the central chamber through a discharge outlet situated on the bottom of the chamber. The area in which water is present is the lower part of the upper vertical vessel and is divided into two areas by a horizontal septum: that situated between the bottom of the vessel and the septum through which the jacketed passage tubes of the gas pass, and that beneath the central chamber and above the septum in which boiling water circulates. The tubes are jacketed in order to prevent damage due to the high temperatures of the ingoing gases.

In an embodiment, the present invention relates to a heat exchanger for the cooling of hot gases by means of a cooling fluid, preferably water, said exchanger comprising: at least one vertically oriented tank containing a cooling fluid bath and having a collection space of the vapour phase generated above said cooling fluid bath,
at least one vertical tubular element inserted inside said tank, open at the ends and coaxial to said tank,
at least one spiral duct which rotates around the axis of the tank, inserted in said coaxial tubular element,
at least one outlet for the vapour phase generated on the head of said tank,
said exchanger characterized in that at least one transfer line is inserted in the lower part of the vertical tank for feeding the hot gases to said tank,
said transfer line being open at the two ends, of which one is connected with the vertical tank and the other is free and outside said tank,
said transfer line being tubular and protruding laterally outside said exchanger,
said transfer line containing at least one central internal duct having an outer jacket in which a cooling fluid circulates,
said central internal duct being in fluid connection with the spiral duct and developing vertically along the tubular element inserted in the vertical tank.

The present invention advantageously allows the refractory material which coats the transfer line of the hot gases and the whole of the lower part of the exchangers used in processes which generate high-temperate gases and in particular in traditional Catalytic Partial Oxidation processes, to be completely eliminated. The only operating unit in which refractory material remains is the reaction apparatus. Furthermore, the mechanical configuration of the present invention allows the high-temperature gaseous products to be separated from the metallic walls of the exchanger which is under pressure, by means of at least two metallic ducts, each having at least one cooling circuit with a double circulation of cooling fluid (for example water). With this expedient, advantageously, it is guaranteed that the metallic walls of the transfer line and lower part of the exchanger, all pressurized parts, never exceed the temperature of the cooling fluid, water, thus creating an intrinsic passive safety. In this way, the intrinsic safety of the heat exchange process itself is increased. The whole system is favoured by an increase in the production of steam (if water is the cooling fluid) as it increases the heat exchange surface available.

Finally, the substitution of part of the refractory material with the cooling fluid circulation system facilitates the scale-up towards large-dimensioned plants, as the transfer line of the hot gases can be easily multiplied.

Further objectives and advantages of the present invention will appear more evident from the following description and enclosed drawings, provided for purely illustrative and non-limiting purposes.

FIG. 1 represents an embodiment of the exchanger object of the present invention, in which:
(5) is a transfer line for feeding the hot gases (1),
(2) is a central internal duct,
(3 and 3a) is a septum inserted in the jacket of the central internal duct (2),
(4) is a jacket around the central internal duct (2),
(6) is a conical interspace which divides the cooling fluid bath into two spaces, one (6a) open towards the vertical tank (6a) and one (6b) open towards the transfer line,
(7) is a connection line,
(8) is a means for circulating cooling fluids, for example water,
(9) is a vertical duct,
(10) is a spiral duct,
(11) is an outlet mouth for the cooled gases,
(12) is an outlet mouth for the vapour phase generated, for example water vapour,
(13) is a vertical tubular element inserted in the vertical tank.

DETAILED DESCRIPTION

The heat exchanger, object of the present invention, has the function of cooling hot gases by means of a cooling fluid, preferably water. The hot gases are preferably synthesis gas and preferably come from catalytic partial oxidation processes in which the oxidizing agent is oxygen and the reaction temperature ranges from 500° C. to 2000° C., preferably from 750° C. to 1600° C.

The exchanger, object of the present invention, comprises:
- at least one vertically oriented tank containing a cooling fluid bath, preferably water, above which there is a collection space of the vapour phase generated, preferably water vapour,
- at least one vertical tubular element inserted inside said tank, said element being open at the ends and coaxial to the tank,
- at least one spiral duct which rotates around the axis of the tank, inserted in said coaxial tubular element,
- at least one outlet for the vapour phase generated on the head of said tank.

Said exchanger is characterized in that at least one transfer line, horizontal or tilted, is inserted in the lower part of the vertical tank for feeding the hot gases to said tank. Said transfer line is open at the two ends, of which one is connected with the vertical tank and the other is free and outside said tank. Said transfer line is preferably tubular and protrudes laterally outside the exchanger. Said transfer line contains at least one central internal duct, preferably tubular, having an outer jacket in which a cooling fluid circulates, said central internal duct being in fluid connection with the spiral duct and developing vertically along the tubular element inserted in the vertical tank.

The jacket of said central duct is preferably tubular and coaxial with the central internal duct. Said jacket also contains a septum, preferably tubular and coaxial with the central duct, to allow the internal circulation of the cooling fluid. Said septum preferably develops for the whole length of the central internal duct as far as the upper end of said duct.

The septum allows the streams of cooling fluid to be separated: the flow of monophase cold fluid circulates from the vertical tank towards the free end of the transfer line, the mixed flow of hot fluid, preferably the mixed water-vapour phase, circulates towards the vertical tank. Said septum in the vertical part of the tank forms an interspace between hot fluid in the mixed phase and monophase cold fluid, creating a density differential and pressure differential, necessary for allowing the natural circulation of the cooling fluid.

An interspace, preferably conical, is also present in the transfer line, which divides the cooling fluid bath into two spaces of which one space is open towards the vertical tank and the other open towards the free and open end of the transfer line. A pressure differential is created between the two spaces which favours the arising of the natural circulation of the cooling fluid.

The exchanger, object of the present invention, also comprises a connection line between the bottom of the vertical tank and the transfer line. At least one means for circulating the cooling fluid is preferably present on said connection line. Said means are preferably a circulation pump (forced circulation) or an ejector fed by a circulation pump (natural assisted circulation).

With reference to FIG. 1, the hot gas (1) enters the central internal duct (2) and continues along the transfer line (5), for the whole vertical duct (9) and the spiral duct (10) as far as the outlet mouth (11). The ducts are all immersed in a cooling fluid bath from which the internal circulation of the same is formed. Said cooling fluid flows along the connection line (7) along which a means (8) for circulating said fluid can be inserted. The cooling fluid then enters the conical interspace (6b), as far as the jacket (4) of the central duct (2) divided by the septum (3 and 3a). The cooling fluids inside and outside the septum flow in equicurrent with respect to the septum (3). The mixed phase of the cooling fluid is mixed with the cooling fluid bath in the vertical tubular element (13). FIG. 1 also illustrates the presence of a tubular element (13) inside the vertical tank which contains the spiral ducts (10) and creates an annular area between walls of the tank and said spiral ducts. In this annular area, a strong descending circulation of the monophase cooling fluid is created, which favours the heat exchange. The vapour generated during the cooling of the hot gases accumulates in the head of the vertical tank and leaves the mouth at the head (12).

A further embodiment of the present invention relates to a heat exchange system comprising at least one reaction apparatus for catalytic partial oxidation and the exchanger described above. Said reaction apparatus comprises:
- a feeding area comprising at least one access for the liquid and gaseous reagents and oxidizing,
- a nebulization and/or vaporization area comprising at least one nebulization and/or vaporization device,
- a mixing area of the compounds fed, situated downstream of the nebulization and/or vaporization device, having a constant or decreasing section along the axis of the apparatus,
- a reaction area containing at least one catalytic system and at least one thermal shield in which reagents and oxidant are converted into hot gases,
- a rapid cooling area of the hot gases produced, The exchanger used in this heat exchange system is characterized in that the transfer line for feeding the hot gases coming from the reaction apparatus, to the exchanger, is directly inserted inside said reaction apparatus, preferably in the rapid cooling area of the reaction apparatus.

The reaction area preferably has a constant or increasing section along the axis of the apparatus, more preferably it has a cylindrical or truncated-conical or truncated-pyramidal form. The mixing area preferably has a cylindrical or truncated-conical or truncated-pyramidal form.

The nebulization and/or vaporization device can be analogous to that disclosed in the granted patent EP1796825, to which reference should be made for more specific details, essentially consisting of:
- a feeding area equipped with means suitable for feeding a liquid stream, a dispersing gaseous stream and a further gaseous stream,
- at least one two-step nebulization area of the liquid stream with the dispersing gaseous stream,
- a distribution area of the further gaseous stream, wherein
- the first step of the nebulization area consisting of a tubular core, through which the liquid stream flows, equipped with a suitable series of nozzles, situated at the same height with respect to each other, and an outer jacket coaxial with said core, through which the dispersing gaseous stream flows, wherein said nozzles allow the dispersing gaseous stream to enter the tubular core perpendicularly to the axis of said tubular core, causing a first nebulization of the liquid stream,
- the second step of the nebulization area essentially consisting of one or more nozzles connected at the bottom of the tubular core, parallel to the axis of said tubular core, to increase its nebulization degree,
- the distribution area essentially consisting of a further gaseous stream, outside and coaxial to the jacket of the first nebulization step, and a series of nozzles, connected at the bottom of said further jacket, situated at the same height with respect to each other and with respect to the axis of the tubular core, parallel or tilted with an angle of less than 40°.

The mixing device can be analogous to that disclosed in U.S. patent application Ser. No. 08/024,4974 to which reference should be made for more specific details, essentially consisting of:
- a first feeding area equipped with means for allowing a first fluid, gaseous under the operating conditions, to enter in an axial direction;
- an underlying distribution area containing a bundle of tubes parallel to the axis inside which said fluid is uniformly distributed;
- a second feeding area equipped with means for allowing a second fluid to enter the distribution area containing the bundle of parallel tubes and be uniformly distributed outside said parallel tubes;
- a mixing area separated from the distribution area by a tube plate supporting said parallel tubes. said tube plate having fissures or openings to allow the second fluid to be uniformly discharged into the mixing area in an axial direction, and said parallel tubes extending beyond said tube plate as far as the mixing area.

The technical advantages obtained by the heat exchange system described above and exchanger itself are the following:
- a reduction in maintenance interventions,
- the creation of a strongly integrated production module of hot gases and cooling of said hot gases with the generation of vapour, when the cooling fluid is water,
- the possibility of pre-assembling a transportable system and installing it in utility sites, reducing times and costs,
- in applications relating to short contact time-catalytic partial oxidation process (SCT-CPO) there is the possibility of installing hydrogen production reactors existing in parallel with a SCT-CPO plant with two tie-in points, reducing interferences in the utility sites to the minimum.

A further embodiment of the present invention relates to a catalytic partial oxidation process for the production of synthesis gas and hydrogen, starting from reagents selected from liquid hydrocarbons, gaseous hydrocarbons, and/or oxygenated compounds, also deriving from biomasses, and mixtures thereof, said process comprising:
- a pre-heating phase of said reagents,
- a reaction phase of the reagents with an oxidizing stream selected from oxygen, air or enriched air to give a stream comprising synthesis gas,
- a rapid cooling phase of the synthesis gas produced, effected using the exchanger object of the present invention.

In a preferred embodiment of the present invention, the oxidizing agent is oxygen and the reaction temperature ranges from 500° C. to 2000° C., preferably from 750° C. to 1600° C.

The process, object of the present invention, possibly comprises a hydrodesulfuration phase. Said process also comprises a conversion phase of the carbon monoxide contained in the synthesis gas to carbon dioxide by means of the Water Gas Shift reaction, followed by a removal phase of said carbon dioxide, and a separation and/or purification phase of the hydrogen contained in the reaction products after the Water Gas Shift reaction.

The invention claimed is:

1. A heat exchanger for the cooling of hot gases by means of a cooling fluid, said exchanger comprising:
   - at least one vertically oriented tank containing a cooling fluid bath and having a collection space of the vapour phase generated above said cooling fluid bath,
   - at least one vertical tubular element inserted inside said tank, and submerged in the bath open at the ends and coaxial to said tank,
   - at least one spiral duct which turns around the axis of the tank, inserted in said coaxial tubular element, and
   - at least one outlet for the vapour phase generated on the head of said tank,
   - wherein at least one transfer line is inserted in the lower part of the vertical tank for feeding the hot gases to said tank,
   - said transfer line being open at the two ends, of which one is connected with the vertical tank and the other is free and outside said tank,
   - said transfer line being tubular and protruding laterally outside said exchanger,
   - said transfer line containing at least one central internal duct having an outer jacket in which a cooling fluid circulates,
   - said central internal duct receives the hot gases and is in fluid connection with the spiral duct and wherein the central internal duct develops vertically along the tubular element inserted in the vertical tank and wherein the jacket of the central internal duct also comprises a septum for allowing the internal circulation of the cooling fluid and wherein the septum contained in the jacket develops for the whole length of the central internal duct as far as the upper end of said central internal duct.

2. The exchanger according to claim 1, wherein the transfer line also contains a conically-shaped interspace which divides the water bath into two spaces, one space open towards the vertical tank and one space open towards the free and open end of said transfer line.

3. The heat exchanger according to claim 1, wherein said transfer line is horizontal or tilted.

4. The exchanger according to claim 1, which also comprises a connection line between the bottom of the vertical tank and the transfer line.

5. The exchanger according to claim 4, wherein at least one means for circulating the cooling fluid is present on the connection line.

6. The exchanger according to claim 4, wherein the means for circulating the cooling fluid is a circulation pump or an ejector fed by a circulation pump.

7. The exchanger according to claim 1, wherein the central internal duct is tubular.

8. The exchanger according to claim 1, wherein the jacket is tubular and coaxial to the central internal duct.

9. The heat exchanger according to claim 1, wherein the septum is tubular and coaxial to the central internal duct.

10. The exchanger according to claim 1, wherein the cooling fluid is water.

11. The exchanger according to claim 1, wherein the hot gas is synthesis gas.

12. A thermal exchange system comprising at least one reaction apparatus for catalytic partial oxidation and the exchanger according to claim 1, said reaction apparatus comprising:
   - a feeding area comprising at least one access for the reagents and oxidant,
   - a nebulization and/or vaporization area comprising at least one nebulization and/or vaporization device,
   - a mixing area of the compounds fed, situated downstream of the nebulization and/or vaporization device, having a constant or decreasing section along the axis of the apparatus, a reaction area containing at least one catalytic system and at least one thermal shield in which reagents and oxidant are converted into hot gases, and a rapid cooling area of the hot gases produced, wherein the transfer line for feeding to the exchanger said hot gases coming from the reaction apparatus, to the exchanger, is directly inserted inside said reaction apparatus.

13. The thermal exchange system according to claim 12, wherein the reaction area has a constant or increasing section along the axis of the reaction apparatus.

14. The thermal exchange system according to claim 12, wherein the transfer line of the hot gases is inserted in the rapid cooling area of the reaction equipment.

15. The thermal exchange system according to claim 12, wherein the mixing area has a cylindrical or truncated-conical form.

16. The thermal exchange system according to claim 12, wherein the reaction area has a cylindrical or truncated-conical or truncated-pyramidal form.

17. A catalytic partial oxidation process for the production of synthesis gas and hydrogen starting from reagents selected from liquid hydrocarbons, gaseous hydrocarbons, and/or oxygenated compounds, also deriving from biomasses, and mixtures thereof, comprising:

a pre-heating phase of said reagents, a reaction phase of the reagents with an oxidizing stream selected from oxygen, air or enriched air to give a stream comprising synthesis gas, a rapid cooling phase of the synthesis gas, and wherein the rapid cooling of the synthesis gas is effected using the exchanger according to the claims from 1 to 11.

18. The process according to claim 17, wherein the oxidizing agent is oxygen and the reaction temperature ranges from 500° C. to 2,000° C.

19. The process according to claim 18, wherein the reaction temperature ranges from 750° C. to 1,600° C.

\* \* \* \* \*